(No Model.) 6 Sheets—Sheet 1.
G. E. D. BALDWIN.
MACHINE FOR HUSKING, SILKING, AND CUTTING CORN.
No. 297,742. Patented Apr. 29, 1884.
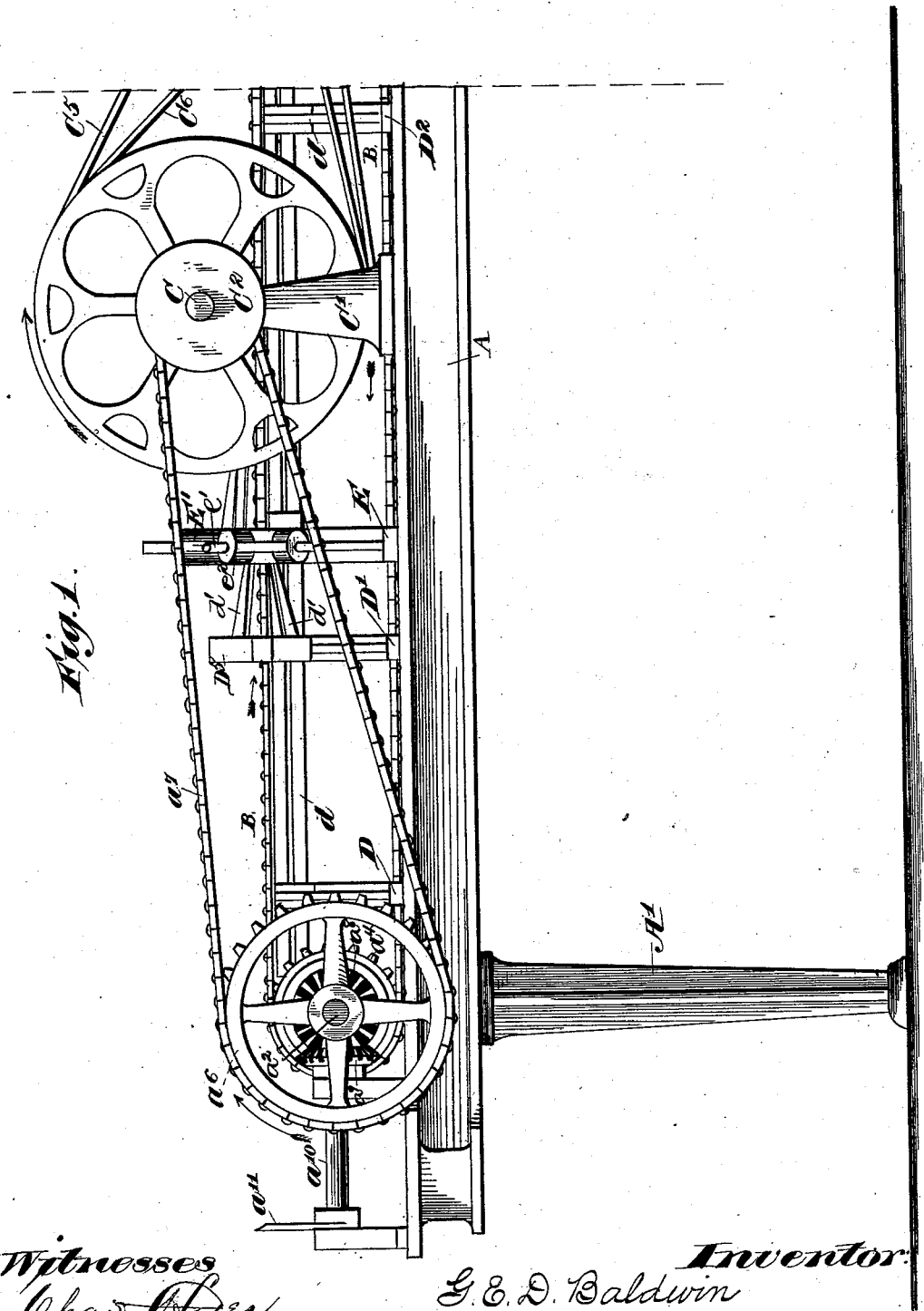
Witnesses
Chas. J. Ager.
Chas. J. Gooch
Inventor
G. E. D. Baldwin
By Brashears & Williams
Attys.

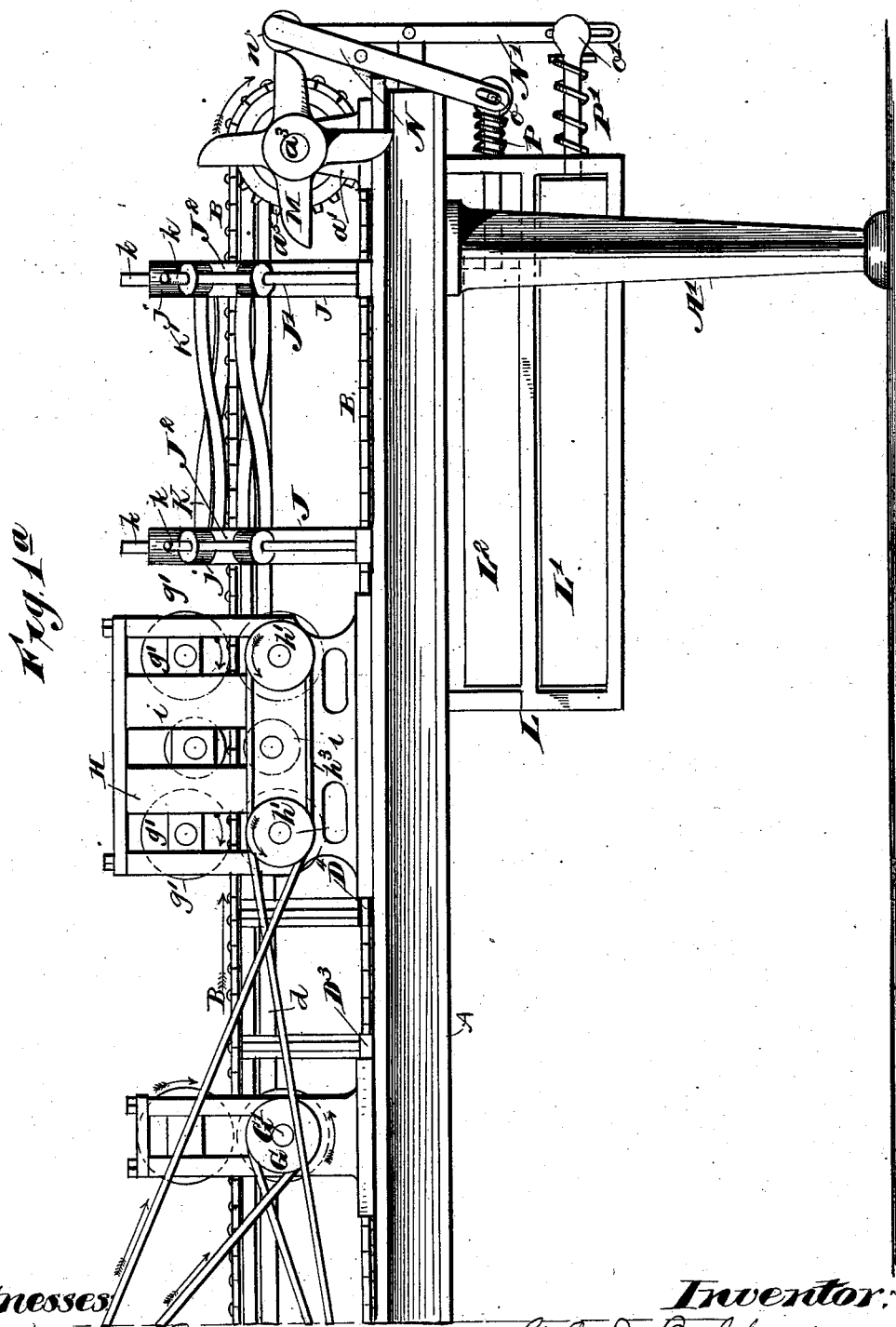

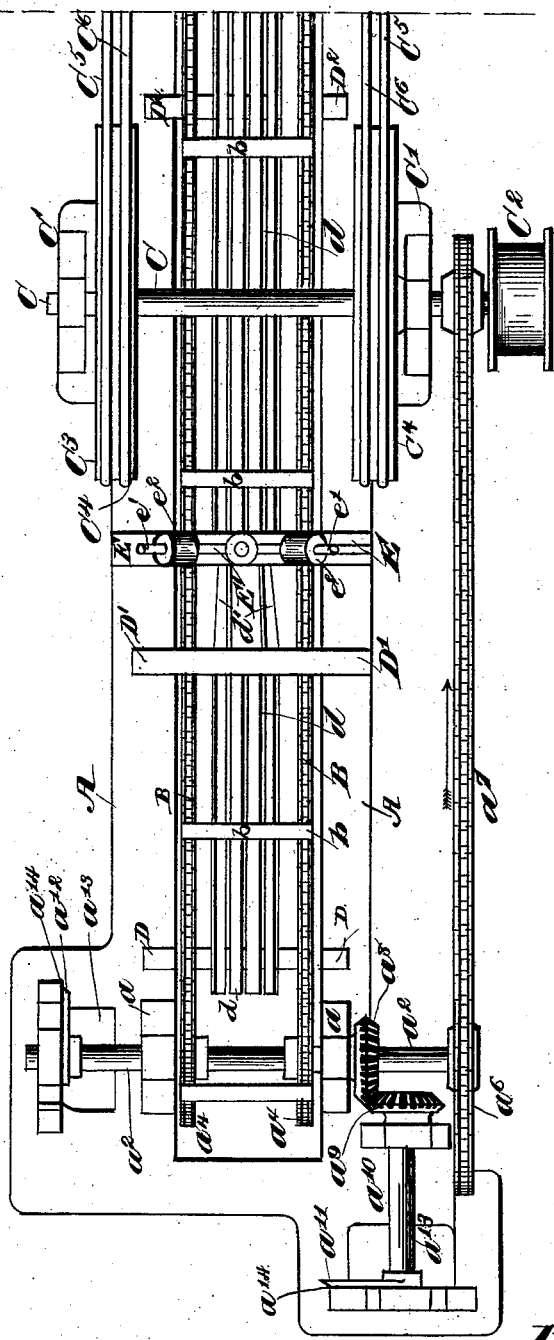

(No Model.) 6 Sheets—Sheet 4.
G. E. D. BALDWIN.
MACHINE FOR HUSKING, SILKING, AND CUTTING CORN.
No. 297,742. Patented Apr. 29, 1884.
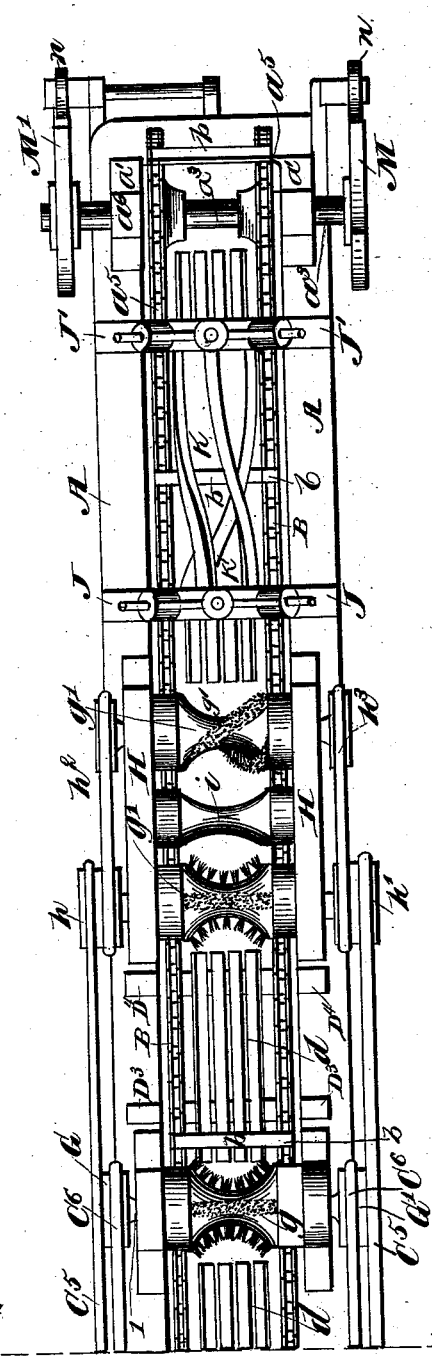

(No Model.) 6 Sheets—Sheet 5.
G. E. D. BALDWIN.
MACHINE FOR HUSKING, SILKING, AND CUTTING CORN.
No. 297,742. Patented Apr. 29, 1884.
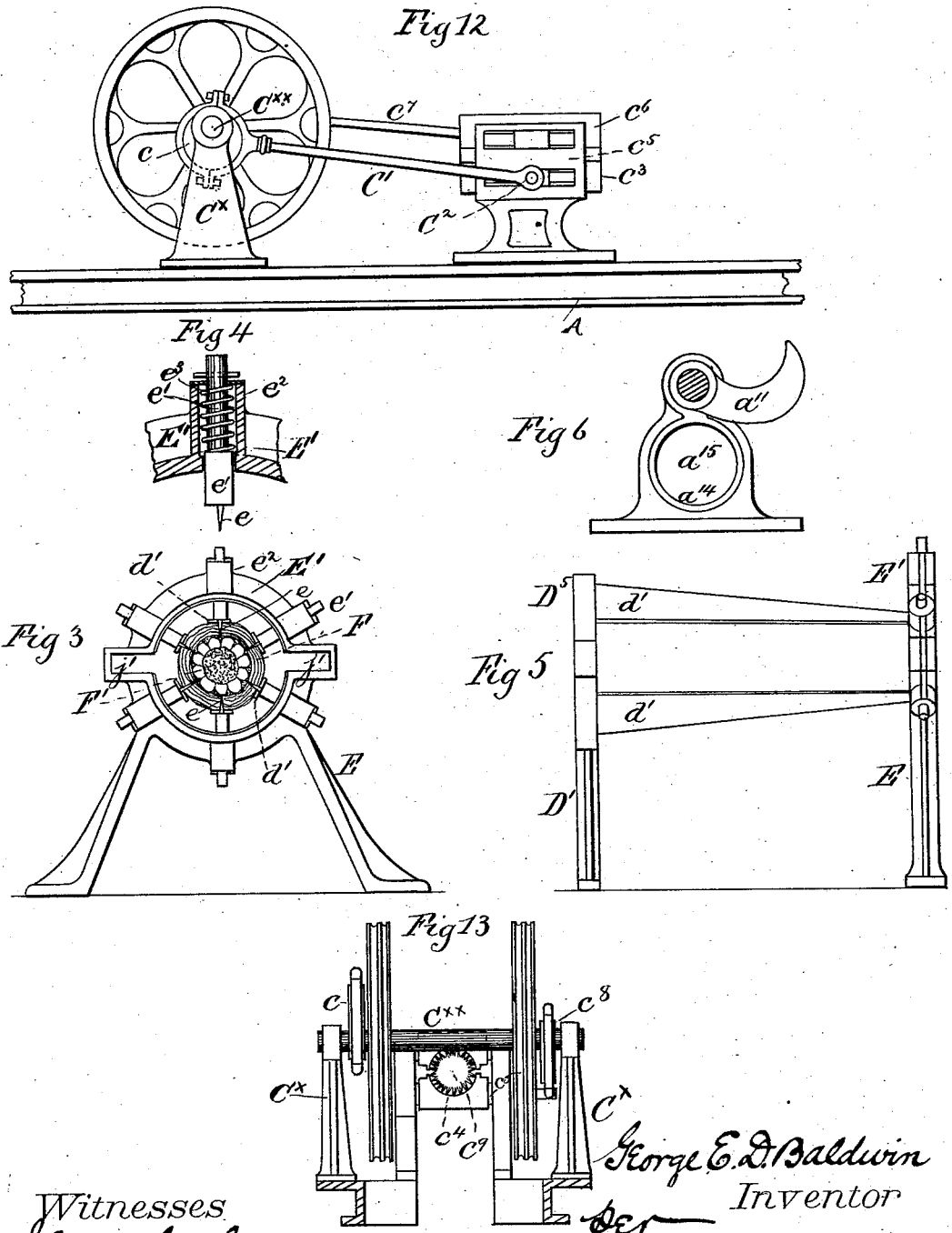

(No Model.) 6 Sheets—Sheet 6.
G. E. D. BALDWIN.
MACHINE FOR HUSKING, SILKING, AND CUTTING CORN.
No. 297,742. Patented Apr. 29, 1884.
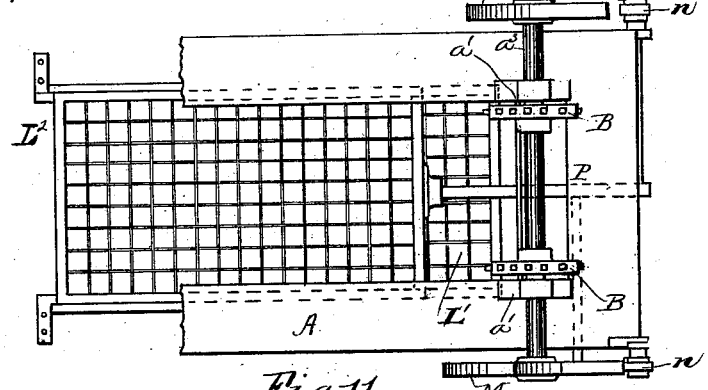
Fig 11
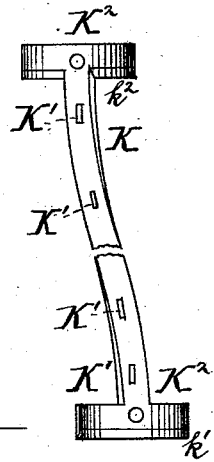
Fig 10
Fig 9
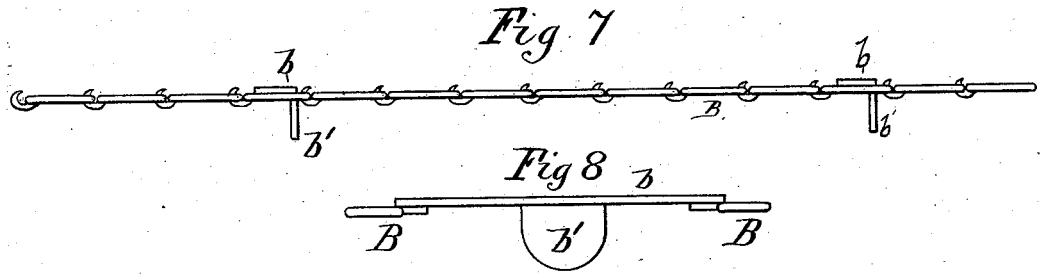
Fig 7
Fig 8
Witnesses
J. Mason Goozler
F. O. Morris
George E. D. Baldwin, Inventor
per
Brashears & Williams
Attorneys

UNITED STATES PATENT OFFICE.

GEORGE E. D. BALDWIN, OF BALTIMORE, MARYLAND, ASSIGNOR, BY DIRECT AND MESNE ASSIGNMENTS, TO LAWRENCE W. COUNSELMAN AND ALBERT L. SCOTT, BOTH OF SAME PLACE.

MACHINE FOR HUSKING, SILKING, AND CUTTING CORN.

SPECIFICATION forming part of Letters Patent No. 297,742, dated April 29, 1884.

Application filed September 18, 1883. (No model.)

*To all whom it may concern:*

Be it known that I, GEORGE E. D. BALDWIN, a resident of Baltimore city, State of Maryland, have invented certain new and useful Improvements in Machines for Husking, Silking, and Cutting Corn, of which the following is a specification, reference being had to the accompanying drawings, forming part hereof, in which—

Figure 1, Sheet 1, is a view in side elevation of the left half of my machine. Fig. 1$^a$, Sheet 2, is a similar view of the right half thereof. Fig. 2, Sheet 3, is a plan view of the left half thereof. Fig. 2$^a$, Sheet 4, is a similar view of the right half thereof. Fig. 3, Sheet 5, is an end view of the slitting-knives and their frame, an ear of corn being shown in section. Fig. 4, Sheet 5, is a detail view, showing the manner of constructing and mounting one of the slitting-knives. Fig. 5, Sheet 5, is a side view, showing the manner of mounting the guards for the slitting-knives. Fig. 6, Sheet 5, is a detail view of one of the cutting-off knives. Fig. 7, Sheet 6, is a side view of the feed-chain. Fig. 8, Sheet 6, is an end view thereof. Fig. 9, Sheet 6, is an end view of the knives for cutting the corn from the cob, showing the spiral guides in section. Fig. 10, Sheet 6, is a plan view of one of these guides and the knives. Fig. 11, Sheet 6, is a plan view of the sieves for separating the cut-off corn from the silk. Fig. 12, Sheet 5, is an elevation of a modified form of brushes and the means for driving them. Fig. 13, Sheet 5, is an end elevation of the same.

Like letters of reference indicate the same parts in all the figures.

The object of my invention is to provide in a more simple and effective manner for cleaning the husk and silk off the ears of corn, either green or dry, and also to cut the corn off said husked ears and separate it from any silk which may accidentally remain on it; and my invention consists in improved machinery for carrying out the above-stated objects of my invention, which machinery I will now proceed to fully describe, the points of novelty being specially pointed out in the claims hereto appended.

A is the frame of the machine, supported on the legs A'. It is substantially rectangular in shape, and carries upon it all the operating parts of the machinery except the seives. The frame A is skeleton in form, as much being cut away under the operating devices as is possible, having due regard to strength, in order to permit the dropping through of the husks and prevent their clogging up the machine. Upon this frame A, near each end, are mounted standards $a\ a'$, in which are journaled, respectively, shafts $a^2\ a^3$, which are provided with sprocket-wheels $a^4\ a^5$, carrying the feed-belt B, which consists of two drive-chains connected at intervals by cross-bars $b$, each of which has a downward-projecting pusher, $b'$. (See Figs. 7 and 8.) This belt B serves to feed the ears of corn completely through the machine. The shaft $a^2$ is also provided at one end of its ends with a pulley or sprocket-wheel, $a^6$, over which passes the belt or drive-chain $a^7$, and which is driven from the power-shaft C, mounted in standards C', secured to the frame A. The shaft $a^2$ is also provided with a bevel-wheel, $a^8$, which drives the second bevel-wheel, $a^9$ mounted on a shaft, $a^{10}$, which carries near its outer end a rotary cutting-knife, $a^{11}$. At the opposite end of the shaft $a^2$ is another similar cutting-knife, $a^{12}$. An opening, $a^{13}$, is made through the table immediately on the inner side of these knives, through which the cut-off portion of the ear drops. These knives revolve in contact with a cutting-edge, $a^{14}$, surrounding an opening, $a^{15}$, through which the end of the ear of corn is placed to be cut off. The knives are of the shape shown at Fig. 6, which gives a clear shearing cut.

Mounted at intervals on the table are standards D D' D$^2$ D$^3$ D$^4$, which serve as supports for a skeleton feed-trough composed of longitudinal bars $d$, said trough being composed of sections reaching from the different parts of the machine, in which trough the ear of corn is supported between the operating devices while being fed through the machine.

At the upper ends of the standards D' is a circular head, D$^5$, within which are secured sheet-metal spring-guards $d'$, which extend longitudinally of the machine and surround a series of knives, $e$, mounted upon radial bars, $e'$, which move in sleeves $e^2$, which form part of another circular head, E', forming the upper part of the standards E. The bars $e'$, which carry the knives $e$, are held normally in their inner positions by spiral springs $e^3$. (See Fig. 4.) The position of the guards $d'$ with relation to the knives $e$ is shown in Fig. 3, in which F represents the husk, and F' the cob of the ear of corn.

The shaft C, before mentioned, is also provided with a pulley, $C^2$, to receive a belt from the line or other shaft to drive the whole machine. It is also further provided with pulleys $C^3$ and $C^4$ on each side of the machine, over which pass belts $C^5$ $C^6$. The belt $C^5$, on one side of the machine, drives through the medium of a pulley, G, a shaft, G', upon which is mounted a rotary brush, $g$, which is one of a pair of such brushes, the other being mounted below it in the same uprights, and driven by the belt $C^6$ on the opposite side of the machine through the medium of pulley G'. Inasmuch as these brushes are to be driven in opposite directions, one of the belts, $C^6$, is crossed. These rotary brushes $g$ are concaved, leaving a space between the upper and lower ones circular in shape, and rotate in a direction opposite to the feed of the belt B. Further on in the machine is mounted in suitable uprights, H, one or more pairs of similar brushes, $g'$, as many pairs being used as is necessary or desirable. These brushes are driven in the same direction as the brushes $g$ by means of the belts $C^5$—one on each side of the machine—engaging pulleys $h$ $h'$, one of said belts being crossed. When more than one pair of brushes is used at this point, the second pair is driven from pulleys on the shafts containing the pulleys, $h$ $h'$ being the shafts of the brushes $g'$. This completes the description of the construction of the devices for husking corn, and inasmuch as this is the principal feature of my invention, I will now proceed to describe their operation before describing the construction of the remainder of the machine, being the devices for cutting the corn off the cob and sifting it.

The ear of corn is taken by the operator and one end inserted in one of the openings $a^{15}$ at the end of the machine, a suitable distance, which may be determined by a gage, if desired, said distance being such as will bring the joint between the stem and ear directly under the knife $a^{11}$ or $a^{12}$. The revolution of this knife severs the stem from the ear. The ear is now reversed, and the silk end cut off by the knife. This leaves the ear wrapped, as it were, in the husk, the husk having no hold at the ends. The ear thus prepared is placed in the skeleton trough in front of the standard D', and is pushed along by one of the cross-bars $b$ on belt B, or, should it be a small ear, by the downward-projecting lip or pusher $b'$. The ear, in its passage through the machine, passes between the guards $d'$, which guide it so that it will come centrally between the radial inwardly-projecting knives $e$, and these guards, in the position shown in Fig. 3, act as stops to the movement of the bars $e'$, and thus prevent said knives from entering the ear any deeper than is necessary, the necessary depth being to the inside of the husk only, thus avoiding any incision of the grain. In the passage of the ear these knives slit the husk into as many strips as there are knives. The husk thus slitted remains on the ear until it, in the continued movement of the belt B, passes between the first series of rotary brushes, $g$, which brushes, moving, as before stated, in a direction opposite to the feed, remove the husk. In many instances these brushes remove all of the husk and silk from the ear; but in order that the operation may be the more thoroughly performed the additional brushes, $g'$, are provided, which insure a perfect cleaning in every individual instance. When more than one pair of the brushes $g'$ are used, a pair of idle-rollers, $i$, are mounted between the adjoining pairs and serve as guides for the ear.

In Figs. 12 and 13 I have shown a modified form of brushes which may be used as a substitute for the rotary brushes $g$. In this modification, on the standards $C^\times$ is mounted, as before stated, a shaft, $C^{\times\times}$, which in this instance carries an eccentric, $c$, or eccentrics, the rod $c'$ from which engages with a pin, $c^2$, on the side of a brush, $c^3$. This brush $c^3$ is grooved longitudinally, as shown in Fig. 13 at $c^4$, and is mounted in guides $c^5$, as is also a similar brush, $c^6$, connected in the same manner, by connecting-rod $c^7$, to an eccentric, $c^8$, on the opposite end of the shaft $C^{\times\times}$, the eccentrics $c$ and $c^8$ being set exactly opposite each other on shaft $C^{\times\times}$, for the purpose of giving the forward stroke of one brush at the same time as the backward stroke of the other. The brushes $c^3$ and $c^6$ being placed one above the other, a circular opening, $c^9$, is formed between them, as seen in Fig. 13, and as the ear of corn is passed between these brushes through this opening the slitted husk is loosened from the cob and drops to the ground.

The machine, constructed and operated as hereinbefore described, is also furnished, as before stated, with mechanism for cutting the grains of corn off the cob and for sifting the corn thus cut off, in order to free it from any silk which may remain in it. This mechanism I will now proceed to describe.

Mounted on the bed of table A are two pairs of uprights, J J' J J', having at their upper ends circular heads $J^2$, (see Figs. 1ª, 2ª, and 9,) and secured within these heads $J^2$ are spiral strips K. These strips K are mounted on the inner ends of spring-impelled arms $k$, moving in sleeves $j$, which form part of the heads $J^2$. These blades or strips K are provided with inwardly-projecting blades K' and broadened heads $K^2$, these heads being formed with cutting-edges $k'$ $k^2$. These circular heads $J^2$, as well as the heads $D^5$ and E', hereinbefore described, are provided with spaces $j'$, through which the feed-belt passes.

Located in a guideway, L, beneath the table and immediately under the blades K are sieves L' L², which are reciprocated longitudinally of the machine by the following mechanism:

On the shaft $a^3$, which carries one end of the feeding-chain, are wiper cam-wheels M M', and pivoted to projections at the end of the machine are two levers, N N', on the upper ends of which are anti-friction rolls $n$, and the lower ends of which are slotted to connect with rods $o'$ $o$ attached to the ends of the sieves L' L². Around the rods $o$ $o'$ are spiral springs P P', which serve to hold the sieves L' L² normally in their outer positions. The ear of corn, after having been cleaned of its husk and silk, and having been passed through the last of the concave brushes, is fed through the heads J² between the blades K. When the forward end encounters the edge $k'$, the said knife-edge begins to cut the corn from the cob, cleaning a space on the cob of the width of said cutting-edge. The further forward movement of the ear carries it to engage with the inward-projecting blades K', which, being set spiral with relation to each other and the cob, causes the cob to turn slightly as it is forced along, giving a shear cut and presenting all the surface to the action of the knife-edges $k'$ $k^2$. As the corn is cut from the cob by these knives it drops through the open bed of the machine onto the sieves, which, by the action of the wiper-wheels M M', pivoted levers N N', rods $o$ $o'$, and springs P P', are reciprocated, causing the corn to drop through the meshes of the sieves into a receptacle placed beneath the bed of the machine to receive it, while any silk which may not have been removed by reason of its being located beneath the grains of corn, as sometimes is the case, will remain in the sieves L' L². The cob will be carried out to the end of the machine by the feed-belt and there dropped upon the ground or floor.

Having thus described my invention, what I claim, and desire to secure by Letters Patent, is—

1. The combination, substantially as described, with the bed of the machine, of the standards D' E, provided with circular heads D⁵ and E', the guide-bars $d'$, secured within the heads D⁶, and the knives $e$, located in the head E', as set forth.

2. The combination, with the circular head E', of the radial spring-impelled bars $e'$, provided with knives $e$, and the feed-belt B, passing through said head and between said knives, for the purpose set forth.

3. The combination, in a corn husking and silking machine, of a series of radial inwardly-pointed knives for longitudinally splitting the husk, and feed mechanism, substantially as described, for carrying the ear between said knives, as set forth.

4. In combination with the head E', provided with radially-arranged sleeves $e^2$, the bars $e'$, knives $e$, springs $e^3$, head D⁵, and spring-guards $d'$, as set forth.

5. The combination, in a corn-husking machine, of a series of inwardly-pointed radial knives for slitting the husk longitudinally, a pair of concave brushes for removing the husk from the ear, and a continuous feed mechanism for impelling the ear consecutively through these devices, substantially as set forth.

6. The combination, with the bed of the machine, of the knives for slitting the husk, the concave brushes, knives for removing the corn from the ear, and continuous feed mechanism, as described, for impelling the ear, as set forth.

7. The combination, with the bed of the machine, of knives for removing the corn from the cob, feed mechanism for forcing the ear between said knives, and reciprocating sieves located below said knives, substantially as and for the purpose set forth.

8. The combination, with the bed of the machine, of knives for cutting off the ends of the ears, knives for slitting the husk longitudinally, concave brushes for removing the husk, and a continuous feed mechanism, substantially as described, for propelling the ear of corn, as set forth.

9. The combination, with the bed of the machine, of knives for cutting off the end of the ear of corn, knives for slitting the husk longitudinally, brushes for removing the husk, and knives for removing the corn from the cob, a feed-trough, sections of which are interposed between each of the devices, and a continuous feed mechanism, substantially as described.

10. In combination, the bed of the machine and the following mechanisms mounted consecutively thereon and operated simultaneously, viz: a knife for cutting off the end of an ear of corn, radial knives for slitting the ear longitudinally, concave rotary brushes for removing the husk and silk, and a continuous feed mechanism for impelling the ear entirely through the machine.

11. The combination, with the bed of the machine and a feed mechanism for impelling the ear entirely through the machine, of devices for cutting off the ends of the ears, devices for slitting the husk, devices for removing it from the ears, and mechanism for cutting the corn from the cob, all arranged and operating substantially as set forth.

12. The combination, with the bed of the machine and a feed mechanism for impelling the ear entirely through the machine, of devices for removing the husk from ears of corn, and devices for removing the grain from the cob, substantially as set forth.

GEORGE E. D. BALDWIN.

Witnesses:
 J. MASON GOSZLER,
 ANDREW JONES.